US012281518B2

(12) United States Patent
Glover

(10) Patent No.: US 12,281,518 B2
(45) **Date of Patent: *Apr. 22, 2025**

(54) COMPOSITE DOOR SYSTEMS

(71) Applicant: AADG, INC., New Haven, CT (US)

(72) Inventor: Daniel Brian Glover, Franklin, TN (US)

(73) Assignee: AADG, INC., New Haven, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/098,497

(22) Filed: Jan. 18, 2023

(65) Prior Publication Data

US 2023/0151675 A1 May 18, 2023

Related U.S. Application Data

(63) Continuation of application No. 16/999,472, filed on Aug. 21, 2020, now Pat. No. 11,560,750.

(Continued)

(51) Int. Cl.
*E06B 3/70* (2006.01)
*E06B 5/10* (2006.01)

(52) U.S. Cl.
CPC .............. *E06B 3/7015* (2013.01); *E06B 5/10* (2013.01); *E06B 2003/7028* (2013.01); *E06B 2003/7046* (2013.01)

(58) Field of Classification Search
CPC ..... E06B 1/14; E06B 1/52; E06B 3/04; E06B 3/14; E06B 3/7015; E06B 3/72;

(Continued)

(56) References Cited

U.S. PATENT DOCUMENTS 2,541,871 A 2/1951 Bristol
2,818,947 A 1/1958 Goldberg (Continued)

FOREIGN PATENT DOCUMENTS

GB 2258685 A 2/1993
WO 2013092626 A1 6/2013
WO 2018063986 A1 4/2018

OTHER PUBLICATIONS

Foamtech North America Ltd., Alufoam, 1 page.

(Continued)

*Primary Examiner* — Kyle J. Walraed-Sullivan
(74) *Attorney, Agent, or Firm* — Moore & Van Allen PLLC; Jeffrey R. Gray

(57) ABSTRACT

Composite door systems are provided for use in a protective barrier structure. The composite door systems provide for quick assembly, safety, security, and resistance to physical impacts or threats. The composite door systems may include a shell and a core that can be factory completed or finished on site. The shell may be shipped to the assembly location of the barrier structure, and the core may be formed on site by pouring liquid fill material into a cavity of the shell, which is allowed to cure into a solid fill material. Hardware housings may be operatively coupled to the shell that are made to receive door hardware but resist the liquid full material from filling the hardware housings. The shell, core, and/or hardware housings may provide resistance to damage, such as projectiles to provide enhanced security protection to the occupants or contents of the building structure.

18 Claims, 8 Drawing Sheets

Related U.S. Application Data

(60) Provisional application No. 62/890,980, filed on Aug. 23, 2019.

(58) Field of Classification Search
CPC ... E06B 2003/66395; E06B 2003/7023; E06B 2003/7028; E06B 2003/7038; E06B 2003/7046; E06B 2003/7059; E06B 2003/7071; E06B 2003/7074; E06B 2003/7082; E06B 2003/7088; E06B 2003/709
See application file for complete search history.

(56) References Cited

U.S. PATENT DOCUMENTS

| | | | | |
|---|---|---|---|---|
| 2,869,695 | A | 1/1959 | Herr | |
| 3,060,522 | A | 10/1962 | Parker | |
| 3,083,798 | A | 4/1963 | Samuel | |
| 3,239,978 | A | 3/1966 | Herbert | |
| 3,546,841 | A | 12/1970 | Randall | |
| 3,834,101 | A | 9/1974 | Wilder | |
| 3,886,688 | A | 6/1975 | Ragland | |
| 4,223,494 | A | 9/1980 | Wendt | |
| 4,719,729 | A | 1/1988 | Wynar | |
| 5,441,779 | A | 8/1995 | Lafond | |
| 5,447,761 | A | 9/1995 | Lafond | |
| 5,528,865 | A | 6/1996 | Johnson et al. | |
| 5,619,823 | A | 4/1997 | Ruff | |
| 8,955,254 | B1 | 2/2015 | Ewoldt | |
| 10,060,181 | B1 * | 8/2018 | Jones, Jr. | E06B 3/822 |
| 10,774,576 | B1 | 9/2020 | Vonnahme et al. | |
| 2001/0003889 | A1 | 6/2001 | Zen | |
| 2003/0200714 | A1 * | 10/2003 | Minke | B28B 1/14 52/423 |
| 2007/0094935 | A1 | 5/2007 | Molinari | |
| 2008/0016820 | A1 | 1/2008 | Robbins et al. | |
| 2010/0024309 | A1 | 2/2010 | Tavarez | |
| 2010/0257802 | A1 * | 10/2010 | Strickland | E06B 3/7015 52/404.3 |
| 2011/0227743 | A1 | 9/2011 | Kilbourne | |
| 2011/0232192 | A1 | 9/2011 | Miller | |
| 2013/0255183 | A1 * | 10/2013 | Briggs, Jr. | E06B 5/20 52/784.1 |
| 2014/0360416 | A1 * | 12/2014 | Deiler | F41H 5/0457 109/64 |
| 2015/0268010 | A1 | 9/2015 | Strauss | |
| 2015/0369568 | A1 | 12/2015 | Nielsen | |
| 2018/0051508 | A1 | 2/2018 | Glover | |
| 2018/0066429 | A1 | 3/2018 | Yau et al. | |
| 2018/0087315 | A1 | 3/2018 | Glover | |
| 2018/0313123 | A1 | 11/2018 | Kenyon et al. | |
| 2018/0320435 | A1 | 11/2018 | Bertovic | |
| 2021/0246710 | A1 | 8/2021 | Ko | |

OTHER PUBLICATIONS

Firestone Fibers & Textiles Company, Product Code: Basalt—Innegra Woven Fabric (FIR-BIT78-60), 1 page.

Honeywell, Spectra®, Technology / Innovation / Investigation VOC: Ultra-Light Weight Ballistic Protection—Fabrics / Sheet Materials, Jan. 21, 2020, 5 pages.

Ray-Bar Ultra-Light Weight UL 752 Level 8 Ballistic Panel, https://www.raybar.com/ballistic-products/ray-bar-ballistic-resistant-metal-doors, 1 page.

Skarr Armor, High Strength UHMWPE Ballistic Fabric 48"x65" NIJ IIIA Capable, 1 page.

AADG, Inc., International Application No. PCT/US2020/047404, International Search Report and Written Opinion, Oct. 22, 2020.

AADG, Inc., International Application No. PCT/US2020/047404, International Preliminary Report on Patentability, Mar. 3, 2022.

Maxineasa et al., "Life cycle analysis of strengthening concrete beams with FRP" section 24.3.1.4 Basalt Fibers—retrieved via Science Direct topic overview "Basalt Fiber" on Mar. 20, 23 (Year: 2018).

ADAG, Inc., Canadian Patent Application No. 3,147,204, Office Action, Oct. 18, 2023.

ADAG, Inc., Canadian Patent Application No. 3,147,204, Office Action, Sep. 17, 2024.

* cited by examiner

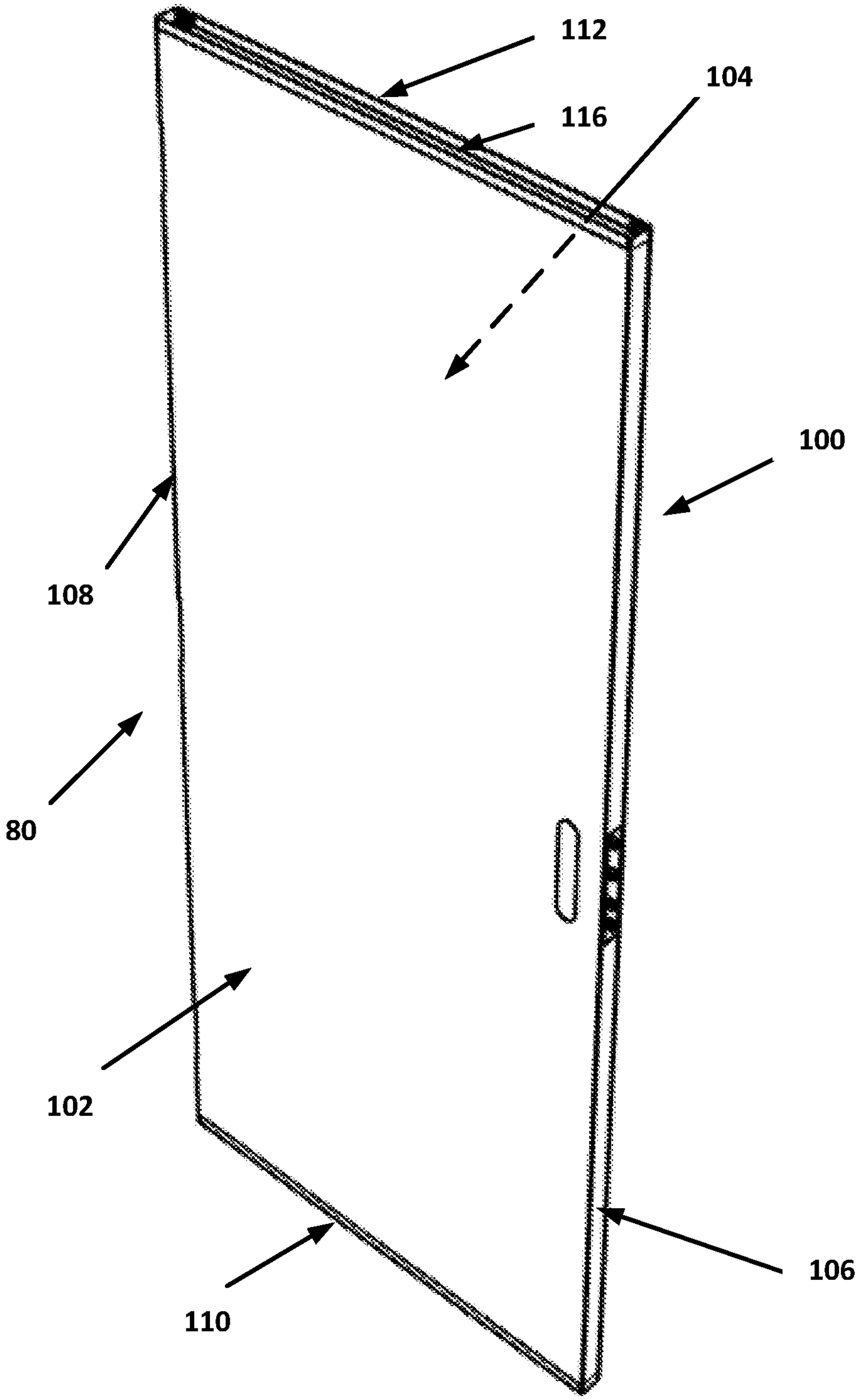
*FIG.* 1a

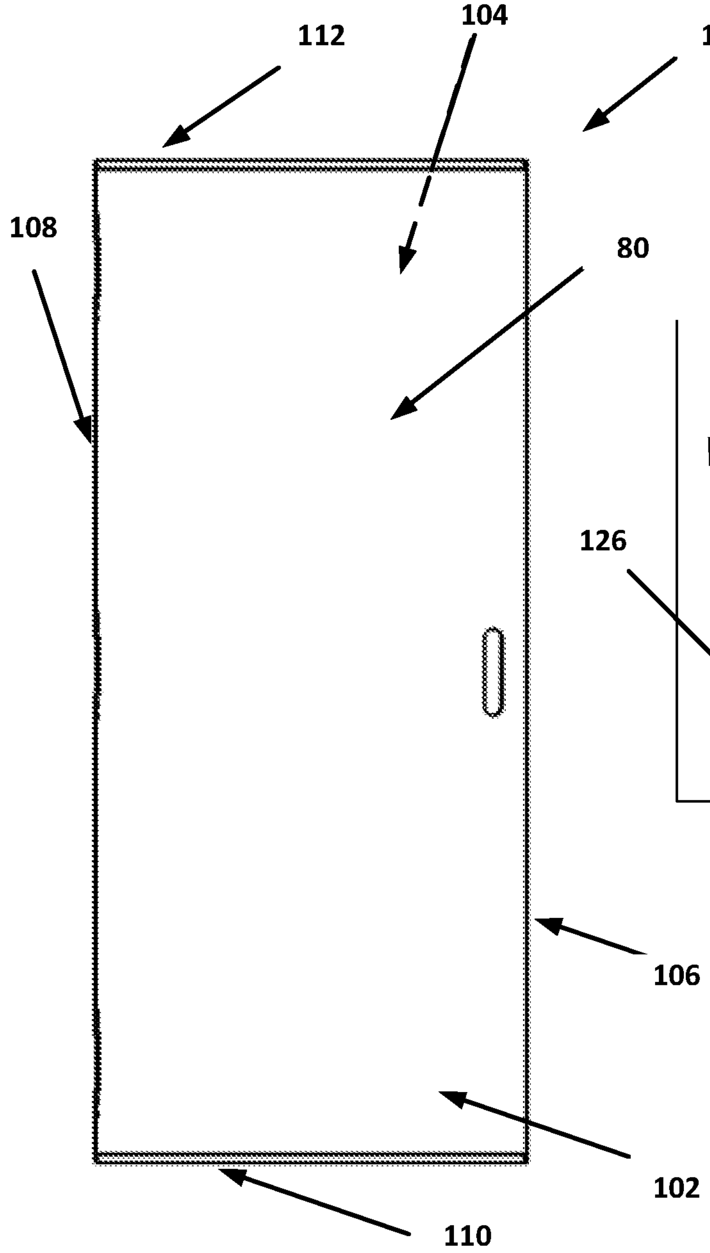
*FIG.* 1b
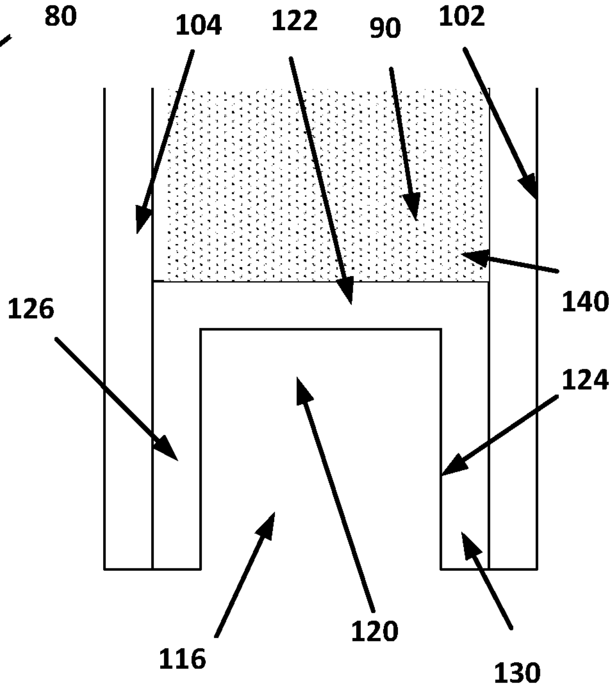
*FIG.* 1c

COMPOSITE DOOR SYSTEMS

CROSS REFERENCE AND PRIORITY CLAIM UNDER 35 U.S.C. § 119

The present Application for a Patent claims priority to U.S. patent application Ser. No. 16/999,472 entitled "Composite Door Systems," filed on Aug. 21, 2020 and issued into U.S. Pat. No. 11,560,750 issued on Jan. 24, 2023, which claims priority to U.S. Provisional Patent Application Ser. No. 62/890,980 entitled "Composite Door Systems," filed on Aug. 23, 2019, both of which are assigned to the assignees hereof and hereby expressly incorporated by reference herein.

FIELD

Embodiments of the present disclosure generally relate to barrier structures, in particular, embodiments of the disclosure relate to a composite door system comprising a shell and a core.

BACKGROUND

Dwellings, buildings, or other like barrier structures, typically comprise doors, walls, floors, roofs, partitions, etc. Moreover, in many instances, it is desirable that the barrier structures provide safety, security, resistance from the elements, such as but not limited to providing protection from extreme weather conditions, unauthorized access by users, or the like. Hence, barrier structures are designed to withstand and resist a variety of physical impacts. There is a need for improved barrier structures, and in particular, improved door systems.

SUMMARY

As will be described herein, the one or more composite door systems of the present disclosure may be utilized within a barrier structure, and may provide resistance to, and protection from, physical impacts, such as penetration from projectiles, as well as protection from fire, physical attacks, explosions, noise, medium and radio frequency radiation, etc. The composite door systems can be utilized in a variety of applications for barrier structures. The composite door systems may comprise a shell formed from a structural material, such as steel, other metals, composites, plastics, or any other material. The composite door systems may further comprise a core, which in some embodiments may be made of a composite material. The shell may be formed having a first face, a second face and a first side, as second side, and a bottom side operatively coupling the first face to the second face. The faces and sides may form a cavity in which a fill material may be provided. The shell may be manufactured and shipped to the installer or customer (e.g., to reduce costs during shipping), and the cavity of the shell may be filled on site with a liquid material that hardens into a solid material to form the core. As such, the top of the composite door system may be open to allow liquid material to fill the cavity within the shell. Alternatively, in some embodiments a top side may be provided that has one or more openings. The top side with the one or more openings may provide structural support to the shell (e.g., during shipping and filling of the cavity) while still allowing for liquid material to pass through the shell into the cavity. In some embodiments, the top side may comprise a plurality of openings. It should be understood that the first face, the second face, the first side, the second side, the bottom side, and/or the top side may be individual members (e.g., operatively coupled together, such as through a weld, or the like), or may be formed from one or more members (e.g., bent into the desired orientations and/or operatively coupled together, such as through a weld, or the like).

One embodiment of the invention comprises a composite door system. The composite door system comprises a shell comprising a first face, a second face, a first side member, a second side member, and a bottom side member. The first face, the second face, the first side member, the second side member, and the bottom side member form a cavity. The shell has one or more openings. The shell further has a fill material, wherein the fill material is provided through the one or more openings of the shell in a liquid material form and hardens to a solid form within the cavity.

In further accord with embodiments of the invention, the composite door system is a door.

In other embodiments of the invention, the shell further comprises one or more hardware housings operatively coupled to the shell. The one or more hardware housings are configured to resist flow of the liquid material. The one or more hardware housings are configured to receive hardware for the door.

In yet other embodiments of the invention, the one or more hardware housings is a solid hardware housing. The solid hardware housing is machined in order to receive the hardware.

In still other embodiments of the invention, the one or more hardware housings is a channel hardware housing. The channel hardware housing is formed from at least one side member of the shell.

In other embodiments of the invention, the one or more hardware housings is a cased hardware housing. The cased hardware housing is configured to receive the hardware.

In further accord with embodiments of the invention, the one or more hardware housings is a tubular hardware housing. The tubular hardware housing is configured to receive the hardware.

In other embodiments of the invention, the one or more hardware housings is a plate operatively coupled the first face or the second face at a hardware location.

In yet other embodiments of the invention, the one or more hardware housings further comprise one or more layers of projectile resistant material to provide additional projectile resistance where the hardware is located.

In still other embodiments of the invention, the hardware comprises mechanical hardware, electrified hardware, a lock, a handle, a hinge, a locking rod, a door closer, a door operator, an exit device, a mag lock, a camera, radar, a sensor, a detection device, a security device, a surveillance device, a knob, or a soft closing device.

In other embodiments, the invention, further comprises a top side member having a plurality of openings. The plurality of openings are configured to receive the liquid material and allow the liquid material to pass into the cavity.

In further accord with embodiments of the invention, the top side member comprises a channel with the plurality of openings. The channel is located between edges of the first face and the second face.

In other embodiments of the invention, the channel comprises a u-shaped channel formed form a web, a first flange, and a second flange, wherein the first flange the second flange are operatively coupled to the first face and the second face.

Another embodiment of the invention comprises a shell for a composite door system. The shell comprises a first face, a second face, a first side member, a second side member, and a bottom side member. The first face, the second face, the first side member, the second side member, and the bottom side member form a cavity. The shell has one or more openings, and the shell is configured to receive a liquid fill material through the one or more openings to form the composite door system when the liquid fill material hardens.

In further accord with embodiments, the invention further comprises one or more hardware housings operatively coupled to the shell. The one or more hardware housings are configured to resist flow of the liquid fill material. The one or more hardware housings are configured to receive hardware for the composite door system.

In other embodiments of the invention, the one or more hardware housings comprise a solid hardware housing, wherein the solid hardware housing is machined in order to receive the hardware. The one or more hardware housings comprise a channel hardware housing, wherein the channel hardware housing is formed from at least one side member of the shell. The one or more hardware housings comprise a cased hardware housing, and wherein the cased hardware housing is configured to receive the hardware. The one or more hardware housings comprise a tubular hardware housing, and wherein the tubular hardware housing is configured to receive the hardware. The one or more hardware housings comprise a plate operatively coupled the first face or the second face at a hardware location.

Another embodiment of the invention comprises a method of forming a composite door system. The method comprises forming a shell. The shell comprises a first face, a second face, a first side member, a second side member, and a bottom side member. The first face, the second face, the first side member, the second side member, and the bottom side member form a cavity. The shell has one or more openings. The method further comprises filling the cavity with a liquid material. The liquid material is provided through the one or more openings of the shell and hardens into a solid form within the cavity.

In further accord with embodiments of the invention, the method comprises shipping the shell after forming the shell to a site, and wherein the filling of the cavity occurs after the shell is received at the site.

In other embodiments, the filling of the cavity occurs at a facility that forms the shell, a distribution facility that ships the shell or the composite door system, or at an installation site.

In yet other embodiments, the method further comprises operatively coupling one or more hardware housings to the shell. The one or more hardware housings are configured to resist flow of the liquid material. The one or more hardware housings are configured to receive hardware for a door.

To the accomplishment the foregoing and the related ends, the one or more embodiments comprise the features hereinafter described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Having thus described embodiments of the invention in general terms, reference will now be made to the accompanying drawings.

FIG. 1*a* is perspective view of a composite door system, in accordance with some embodiments of the disclosure.

FIG. 1*b* is a front view of a composite door system, in accordance with some embodiments of the disclosure.

FIG. 1*c* is a cross-sectional view of a portion of the bottom side of the composite door system of FIG. 1*a*, in accordance with some embodiments of the disclosure.

Figure 2A:
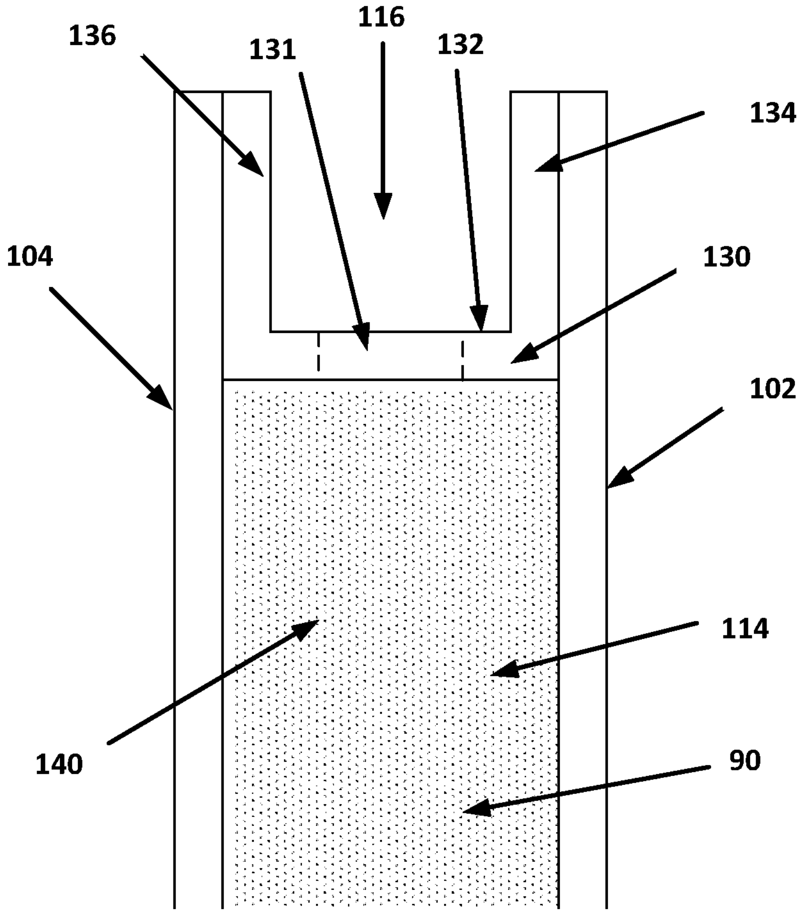

FIG. 2*a* is a cross-sectional view of a portion of the top side of the composite door system of FIG. 1*a*, in accordance with some embodiments of the disclosure.

Figure 2B:
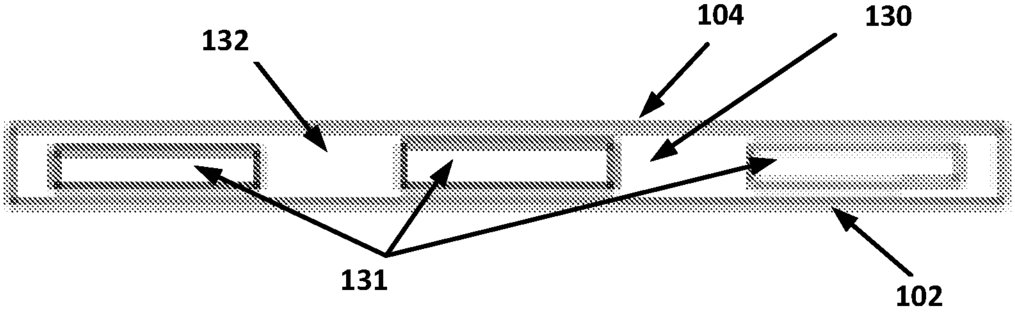

FIG. 2*b* is a top view of the composite door system of FIG. 1*a*, in accordance with some embodiments of the disclosure.

Figure 3:
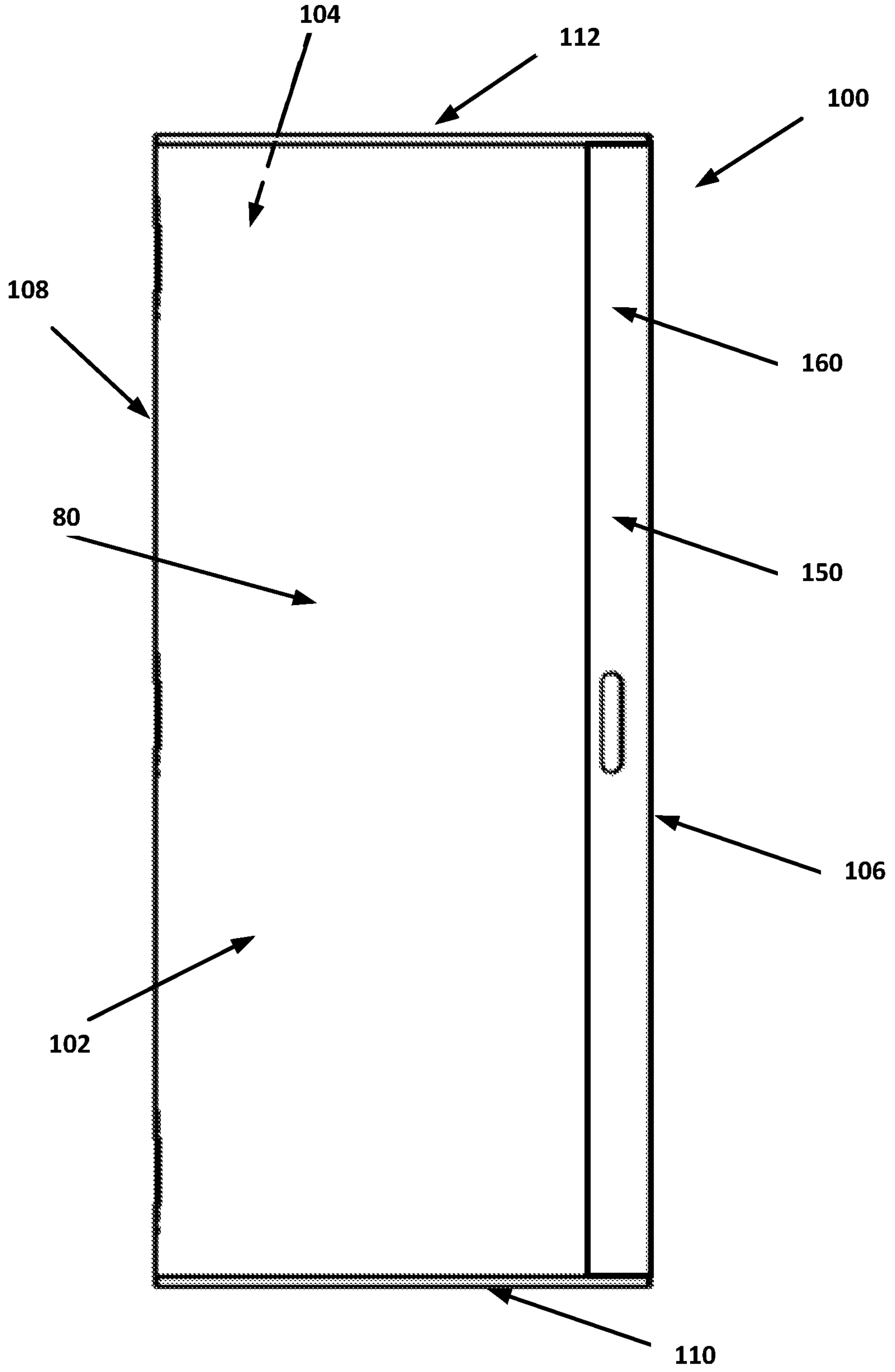

FIG. 3 is a front view of a composite door system with a solid hardware housing mounted to the composite door system, in accordance with some embodiments of the disclosure.

Figure 4:
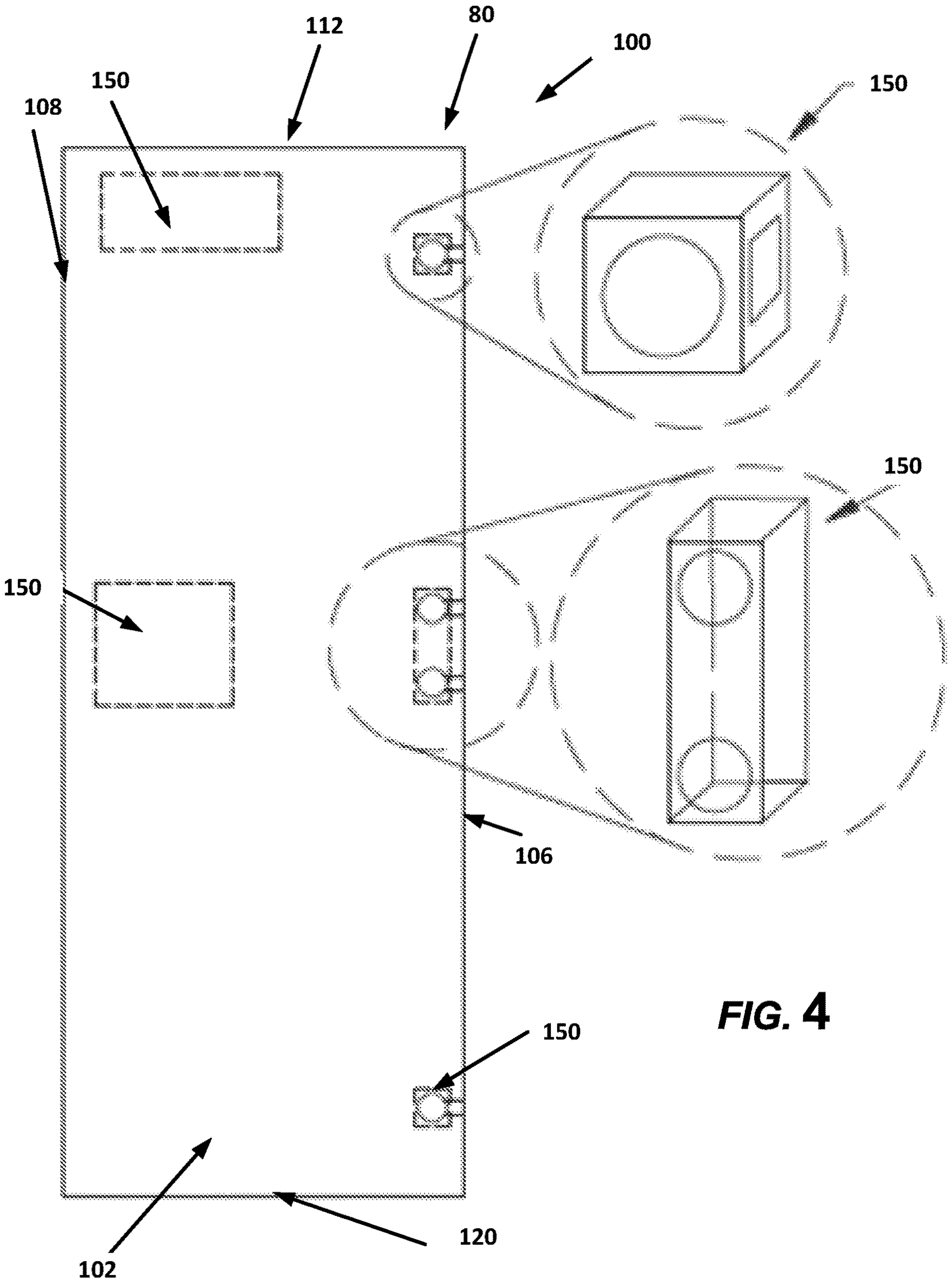

FIG. 4 is a front view of a composite door system with cased hardware housings mounted to the composite door system, in accordance with some embodiments of the disclosure.

Figure 5:
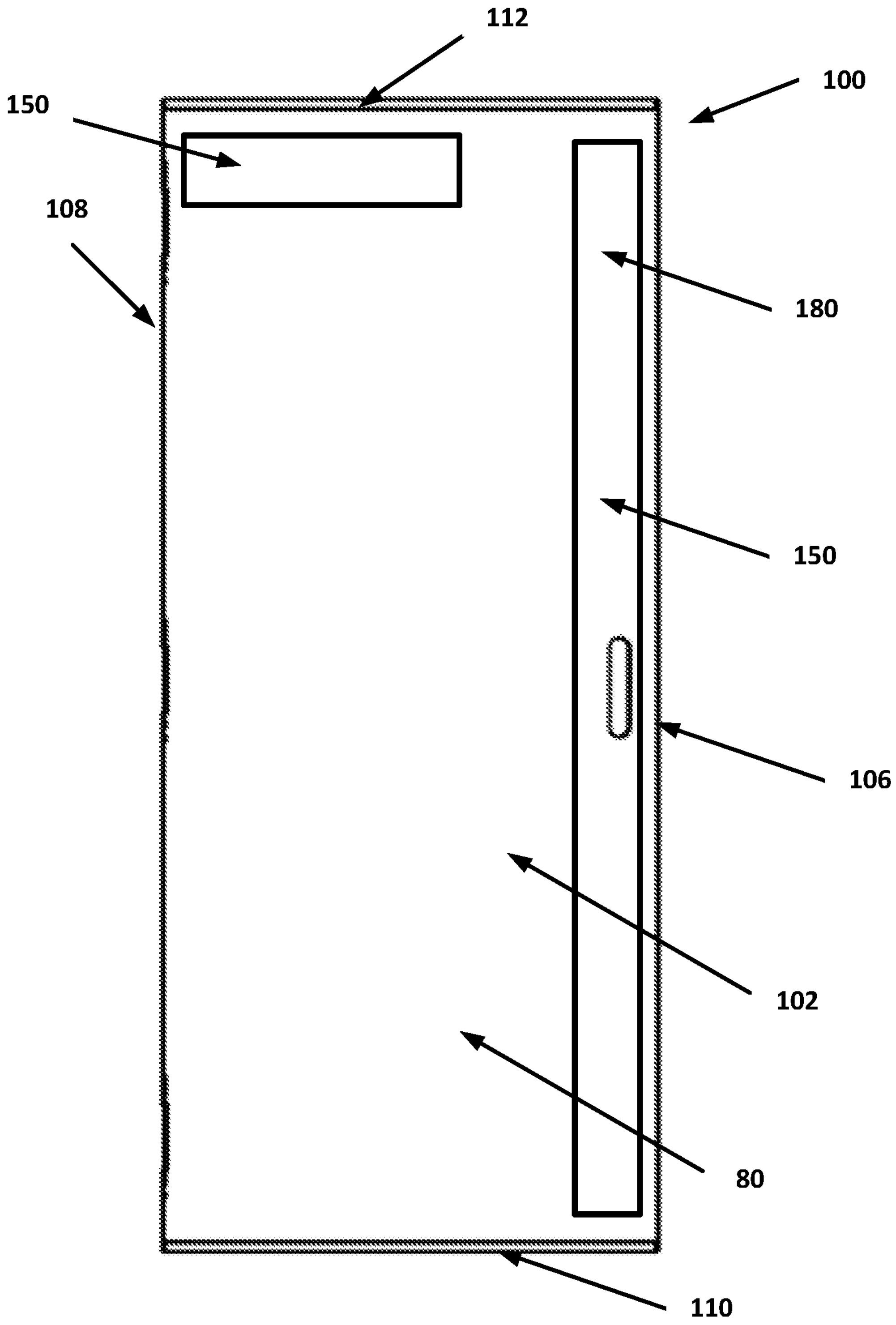

FIG. 5 is a perspective view of a composite door system with a tubular hardware housing mounted to the composite door system, in accordance with some embodiments of the disclosure.

Figure 6:
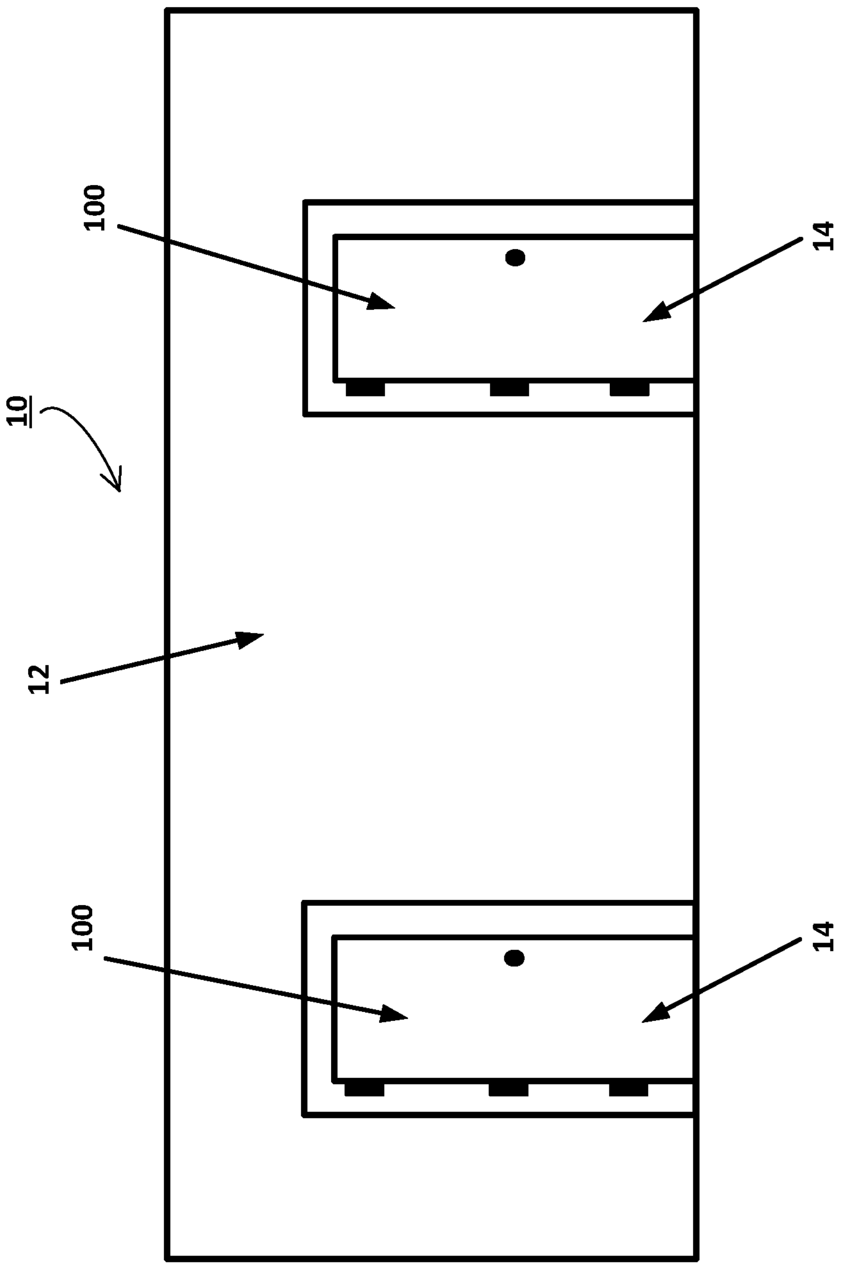

FIG. 6 is a front view of a barrier structure using a composite door system, in accordance with some embodiments of the disclosure.

Figure 7:
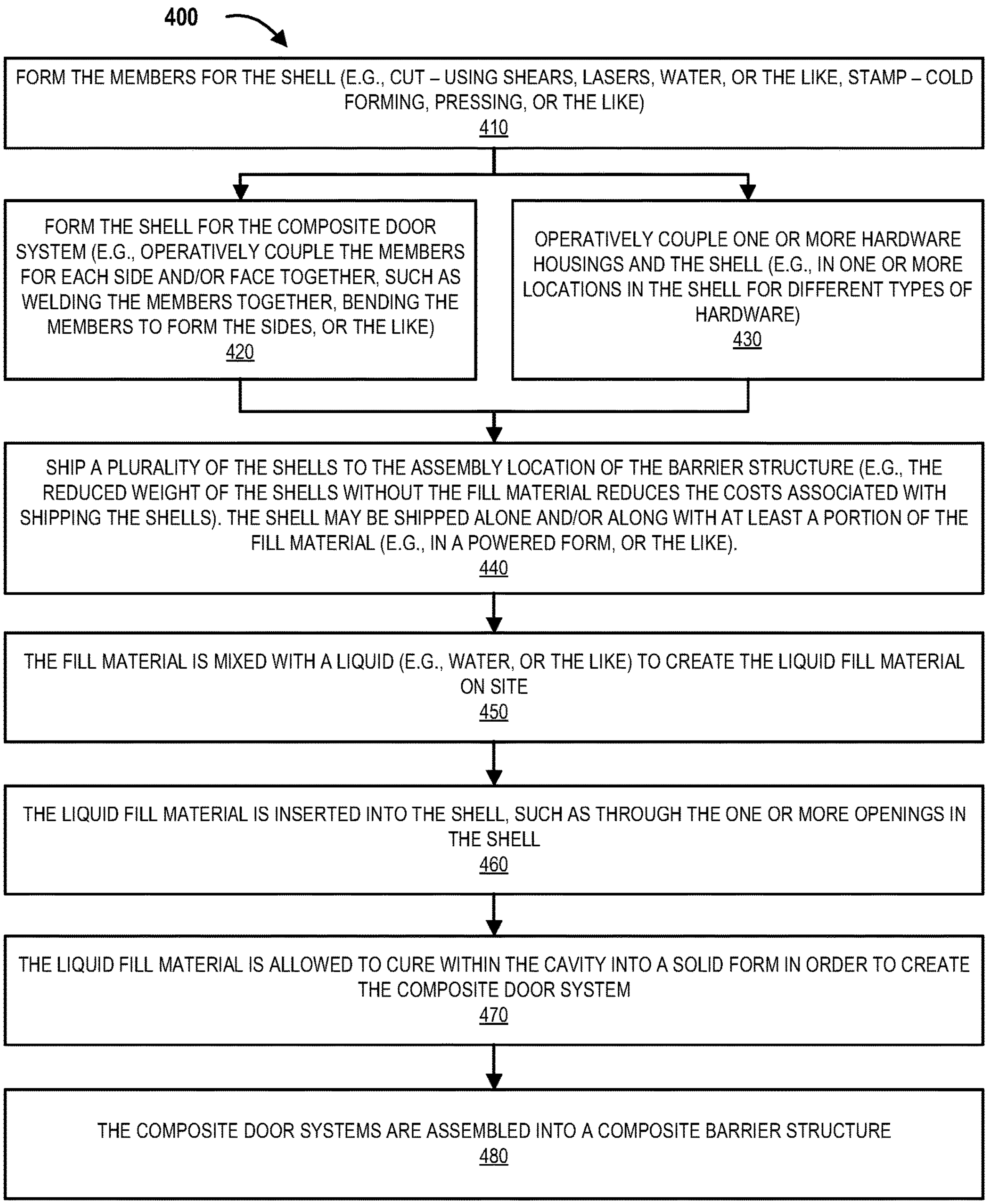

FIG. 7 is a process flow related to forming a composite door system by forming a shell, shipping the shell, and filling the shell, in accordance with some embodiments of the disclosure.

DETAILED DESCRIPTION

The following detailed description teaches specific example embodiments of the invention; however, other embodiments of the invention do not depart from the scope of the present invention. The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including" when used herein, specify the presence of stated features, steps, operations, elements, and/or components, but do not preclude the presence or addition of one or more other features, steps, operations, elements, components, and/or groups thereof.

As illustrated in FIG. 1*a*, the composite door system 100 may comprise a first face 102 (e.g., a front face), a second face 104 (e.g., a rear face), a first side 106 (e.g., a right side), a second side 108 (e.g., left side 108), a bottom side 110 (e.g., a lower side), and/or a top side 112 (e.g., an upper side). It should be understood that the first face 102, the second face 104, the first side 106, the second side 108, the bottom side 110, and/or the top side 112 may be members that are operatively coupled together (e.g., separate members that are coupled together, members that are integrally formed together, and/or the like).

The sides and faces when operatively coupled together form a shell 80 having a cavity 114, and the cavity may be filled to create a core 90, such as filled using a fill material 140. The shell 80 may be made of any type of material (e.g., steel, plastic, composite, fiberglass, or the like). However, in some embodiments the shell 80 may be 24, 22, 20, 18, 16, 14, 12, 10, 8, or any other gage steel ranging between, overlapping, or falling outside of these values. In some embodiments, the fill material 140 may be a homogenous cementitious material (e.g., concrete, or the like), a composite cementitious material (e.g., including a mixture of cementitious material and/or other materials, such as fibers, foam, or the like). It should be understood that cementitious means any type of cement or other like material, such as traditional cement, fly ash, blast-furnace slag, limestone fines, aggregate, and/or other types of cementitious materials, alone or in combination with each other. The fill material 140, such as the composite cementitious material, may be much lighter than traditional homogenous cementitious material. For example, the fill material 140 may be 10, 20, 30, 40, 50, 60, 70, or the like percent lighter than traditional cementitious material, or range between, overlap, and/or fall outside of any of these values. It should be understood that the cementitious material may be inserted into (e.g., poured, or the like) into the cavity 114 in the form of a liquid fill material (e.g., completely liquid, liquid having particulates, and/or the like) which then hardens into a solid core 90.

The first side 106, second side 108, and/or bottom side 110 may be formed from members, which may have any type of shape, such as but not limited to a planer shape, a v-shape, u-shape, convex, concave, irregular, or any other type of shape. Moreover, it should be understood that regardless of the shape of the member, when the member is installed it may sit within the edges of the first face 102 and/or second face 104. As such, the members may form a channel 116 in any of the one or more of the sides 106, 108, 110, 112 of the shell 80. As illustrated in FIG. 1*b*, the bottom side 110 of the composite door system 100 may have a bottom u-channel member 120 having a web 122 and a first flange 124 and/or second flange 126 operatively coupled to the web 122. It should be understood that the first flange 124 and/or second flange 126 may be operatively coupled to the first face 102 and/or second face 104 by any type of connector (e.g., fasteners—bolts, rivets, screws, or the like, welds, or other like connectors). Moreover, while FIG. 1*c* illustrates that the bottom side 110 has a channel 116, it should be understood that the first side 106 and/or second side 108 may also have a similar channel configuration of any shape (e.g., planer, u-shaped, v-shaped, concave, convex, and/or any other type of shape). As such, any of the sides 106, 108, 110, 112 of the composite door system 100 may have any type of member used to operatively coupled the first face 102 to the second face 104. In some embodiments of the invention, the channels 116 on the sides 106, 108, 110, 112 which sits at least partially within the edges of the first face 102 and/or the second face 104 may provide a location for attaching hardware (e.g., mechanical and/or electrified hardware, including but not limited to locks, handles, hinges, locking rods, door closers, door operators, exit device, mag locks, cameras, radar, sensors, detection devices, security devices, surveillance devices, knobs, soft closing devices, deadbolts, and/or other hardware), as will be described in further detail herein.

Moreover, as discussed with respect to the bottom side 110, first side 106, and/or second side 108, the top side 112 may have any type of member of any shape, including any type of channel 116. For example, as illustrated by the cross-section view of the top side 112 of the composite door system 100 in FIG. 2*a*, and the top view of the top side 112 of the composite door system 100 in FIG. 2*b*, a top member may have one or more openings. For example, the top member may form a channel 130 within the top side 112 of composite door system 100, such as a u-shaped channel 130 having a web 132, a first flange 134 and/or a second flange 136. However, as previously discussed, the top member may have any shape, such as planer, u-shaped, v-shaped, convex, concave, and/or other shape that may or may not provide a channel in the top side 112. The u-shaped channel member 130 may comprise a web 132 and a first flange 134 and/or a second flange 136 that are operatively coupled to the web 132. It should be further understood that the web 132 of the u-shaped channel member 130 may comprise one or more openings 131 that allow for filling the cavity 114 of the composite door system 100 with a liquid material that later hardens, as will be described in further detail herein.

It should be further understood that in some embodiments the shell 80 may further comprises one or more support members to form a reinforced core (e.g., reinforced concreate core). The one or more support members may be vertical support members (as shown), horizontal support members (not illustrated), angled support members (not illustrated), or the like. The one or more support member may provide additional structural support for the composite door system 100. In some embodiments the one or more support members may be operatively coupled to the first face 102 and/or the second face 104 to provide additional support to the composite door systems 100. The one or more support members may be any type of shape, including, but not limited to z-shaped, c-shaped, L-shaped, truss shaped, corrugated shaped, tubular shaped (e.g., circular, oval, square, rectangular, or the like), non-uniform shape, or any other like shape. In some embodiments, the support members may be 22 gage z-shaped stamped steel members 232; however, it should be understood that any gage steel may be utilized (e.g., 10, 12, 14, 16, 18, 20, 22, 24, or the like, or otherwise range between, overlap, and/or fall outside of any of the forgoing values). In some embodiments, the support members may be placed no more than 6 inches apart; however, in some embodiments, the support members may be placed 1, 2, 3, 4, 5, 6, 8, 10, 12, 16, 20, 24, or the like inches apart, or otherwise range between, overlap, and/or fall outside of any of the forgoing values. The one or more support members may be operatively coupled to the first face 102 and/or second face 104 through the use of a coupling, such as welds, fasteners (e.g., bolts, rivets, screws, or the like), adhesive, tape, epoxy, or other like couplings.

As illustrated in FIG. 2*b*, the one or more openings 131 may be located in series along the top member (e.g., two, three, four, or the like openings). However, it should be understood that the one or more openings 131 may be located in series, be alternated, in parallel, uniform, non-uniform, and/or be formed with any pattern. It should be further understood that while the one or more openings 131 are illustrated as being rectangular in FIG. 2*b*, the one or more openings 131 may be any shape, such as but not limited to square, circular, oval, triangular, trapezoidal, pentagonal, octagonal, hexagonal, any polygonal shape, and/or other like shape. Moreover, while the openings 131 are illustrated as being located within the top member 130, it should be understood that openings may be located in any side and/or face (e.g., first face 102, second face 104, first side 106, second side 108, bottom side 110, or the like). The one or more openings 131 may be 1.5 inches wide by 8 inches long, however, it should be understood that the one or more openings 131 may be any width (e.g., 0.25, 0.5, 0.75, 1, 1.25, 1.5, 1.75, 2.0, 2.25, 2.5, 2.75, 3.0, or the like), length (e.g., 1, 2, 3, 4, 5, 6, 7, 8, 10, 12, 14, 16, 18, 20, 22, 24, 26, 28, 30, or the like), and/or thickness (e.g., the thickness of the member). It should be understood that the width and/or length may range between, overlap, or fall outside of any of these values. Regardless of the location and/or size of the one or more openings 131, the openings allow for the passage of liquid fill material into the cavity 114, which then hardens in the door to form a core 90 of the composite door system 100 that is damage resistant (e.g., projectile resistant, attack resistant, blast resistant, fire resistant, etc.).

It should be understood that the channels 116, such as the u-shaped members 120 may be described herein as a hardware housing 150. As such, the members, such as the u-shaped channel members 120 or the like, may provide locations in which to assemble hardware. The members provide a "mix guard" (e.g., "fill material guard") to prevent cavity fill materials 140 from entering the locations designated for hardware installation. Furthermore, the members may provide structure to the composite door system 100 in order to allow for shipping of the hollow shell 80 without damaging the shell 80. In particular, using a top member at the top side 112, as opposed to an open top side 112 may provide improved structural support to the top side 112 of the shell 80. It should be further understood that the shell 80 may further have one or members operatively coupled between the first face 102 and/or the second face 104, which provides additional structural support to the shell 80 before the cavity 114 within the shell 80 is filled with fill material 140. The hardware housings 150 (e.g., the channels 116, or other hardware housings 150 described below in further detail) may be manufactured using FE (forced entry) and/or BR (Bullet Resistant) (collectively otherwise described herein as FEBR) resistant materials, composites, or the like to protect the hardware from projectiles, explosions, physical attack, or the like as described herein.

In other embodiments of the composite door system 100, other hardware housings 150 may be used to secure door hardware instead of using a channel, as described above. For example, the hardware housings 150 may comprise a solid hardware housing 160 as illustrated in FIG. 3, a cased hardware housing 170 as illustrated in FIG. 4, a tubular hardware housing 180, and/or other type of hardware housings 150 and/or combinations thereof.

For example, as illustrated in FIG. 3 the shell 80 of the composite door system 100 may be operatively coupled to a solid hardware housing 160, such as solid damage resistant material (e.g., projectile resistant material, or the like). The damage resistant material (e.g., projectile resistant material, or the like) may be, but is not limited to fiberglass, Kevlar, steel armor, polycarbonate, aluminum or other metals, laminate, carbon fiber, polyurethane, acrylic, other like material, or combinations thereof. The damage resistant material (e.g., the projectile resistant material, or the like) may be machined in order to create apertures for receiving door hardware. Alternatively, or additionally, the damage resistant material (e.g., projectile resistant material, or the like) may be formed into the desired shape to receive the desired hardware without machining or with minimal machining. As such, as illustrated in FIG. 3, the projectile resistant material may be machined for receiving hardware before and/or after the projectile resistant material is operatively coupled to the shell 80. It should be understood that the projectile resistant material (or other damage resistant material) may also provide a fill material guard that prevents the fill material 140 from flowing in the hardware apertures where the hardware may be located, while still providing resistance to projectiles, or other impacts, from damaging the hardware. It should be understood that the solid hardware housing may be 12 inches wide (or other sizes, such as 6, 7, 8, 9, 10, 11, 13, 14, 15, 16, 17, 18, 20, 24, or the like or range between, overlap, or fall outside of these values).

As illustrated in FIG. 4, the cased hardware housing 170 may comprise a box, or a portion thereof, that is operatively coupled to the first face 102 and/or the second face 104. The cased hardware housing 170 may comprise a housing having five sides with an open side, four sides with two open sides, three sides with three open sides, and/or two sides (L-shaped member) with four open sides, and/or in some embodiments may comprise a plate (e.g., a planer member that is operatively coupled to the first face 102 and/or the second face 106). In some embodiments the cased hardware housing 170 may be made of steel, a fiberglass material, or the like. Moreover, the cased hardware housing 170 may be any size, such has having a thickness of 1/16", 1/8", 1/4", 1/2", 2/3", 3/4", 1" or other like size, or range between, overlap, and/or fall outside of these values. In some embodiment, steel of at least 1/4" may be utilized in order to provide level 7 or 8 resistance to projectiles, as will be discussed in further detail herein. It should be understood that the cased hardware housing 170 (or the channel housings previously described, or other hardware housings) may have a 0.5", 1", 1.5", 2", 2.5", 3", 4", 5" or the like opening in the cased hardware housing to allow for assembly of the hardware (e.g., for a 1" mortise lock, or the like).

As illustrated in FIG. 5, the hardware housings 150 may comprise a tubular hardware housing 180 that is operatively coupled to the first face 102 and/or the second face 104. The tubular hardware housing 180 may be of any shape, such as a cylindrical tube, a square tube, a circular tube, oval tube, a rectangular tube, any polygonal tube, an irregular tube, and/or any other type of tube to which hardware may be operatively coupled. The core may surround all or at least a portion of the tubular hardware housing 180.

It should be understood that any type of hardware housing 150 may be located within any location of the composite door system 100 depending on the type of hardware and/or the location of such hardware. It should be understood, for example, as illustrated in FIGS. 3 and 5 that the hardware housings 150 may run adjacent the entirety, or a portion thereof, of a side of the composite door system 100, such as along the first side 106. This location may allow for locating a locking mechanism (e.g., a mortise lock, elongated bar lock, door knob, door lever, deadbolt lock, or the like). Moreover, as illustrated in FIG. 4 the hardware housings 150 may be located along different positions adjacent the first side 106, second side, and/or the top side 112. These locations may allow for locating a locking mechanism in different locations along the edges (e.g., first side 106, second side 108, or the like) and/or allow for the attachment of different types of handles (e.g., panic exit handles and locking mechanisms, such as L-shaped pivoting handles, or the like). Moreover, as illustrated in FIGS. 4 and 5, including a hardware housing 150 adjacent the top side 112 of the composite door system 100 may allow for operative coupling of a door closer or door operator (e.g., collectively door control system). It should be further understood that the hardware housings 150 may be located adjacent any side of the composite door system 100 and/or within the composite door system 100 (e.g., in the interior away from the edges, or the like) in order to protect the hardware from projectiles or provide other damage resistance. The hardened fill material 140 is what typically provides protection from projectiles or other damage, and the hardware may be located within the composite door system 100 at locations that may not be thick enough to provide the desired protection using the fill material 140. As such, the hardware housings 150 may be utilized to provide the desired protection at these locations. Therefore, regardless of the type of hardware housing 150, it may be made of a material and/or have a thickness that provides different levels of damage resistance (e.g., projectile resistance, attack resistance, or the like). For example, the hardware housings 150 may provide UL level 1, 2, 3, 4, 5, 6, 7, 8, 9, 10, or the like protection from projectiles, as will be described in further detail herein.

While the first face 102, second face 104, first side 106, second side 108, bottom side 110, and/or top side 112 may have surfaces that are smooth (or generally smooth, or substantially smooth, or the like), the faces and/or sides may have structural elements in the exterior surfaces (surfaces that can be seen) and/or interior surfaces (surfaces facing the cavity 114), such as corrugations, or the like, which provide structural support to the shell 80 before the cavity is filled with fill material 140.

It should be further understood, that depending on the desired application of the composite door system 100, there may be one or more additional layers that comprise of other materials, such as but not limited to water resistant or proofing layers, concreate layers, coatings, or the like depending on the operation and/or installation requirements for the composite door systems 100 and/or the barrier structures in which they may be used.

In some embodiments of the disclosure, the composite door systems 100 may include a window portion. The window portion may be transparent, semi-transparent, or non-transparent. The window portion may be described as a sidelight, transom, borrowed light, door light, sash window, roller window, louver, or any other like window. The window portion may be damage resistant (e.g., projectile resistant, element resistant—wind, attack resistant, fire resistant, blast resistant, or the like). The window portion may be made from any type of material such as glass, acrylic, polycarbonate, laminate, other type of material, or combinations thereof in one or more layers. The window portion may itself be damage resistant or the window portion may have a glazed layer that is damage resistant. As such, the window may have a UL level 1, 2, 3, 4, 5, 6, 7, 8, 9, 10, or the like rating. The window portion may be installed in the shell 80 of the composite door system 100 before shipping to the installer, or it may be installed on site by the installer. As such, the window may be installed within a window housing that is similar to, or the same as the hardware housings 150 previously described herein. The liquid fill material 140 may be poured into the cavity 114 of the shell 80 with the window installed or before the window is installed, and the liquid fill material 140 will flow around the window and/or the window housing in order to fill the cavity 114 of the shell 80. As such, one or more members may be located within the cavity 114 in order direct the flow of the liquid flow material 140 within the cavity 114. Alternatively, the shell 80 filled with the hardened fill material 140 may be retrofitted with a window portion, that is, after the fill material 140 hardens in the cavity 114 on-site, or within an installed composite door system 100 that is retrofitted after installation. Moreover, any window portions already installed within a composite door system 100 may be retrofitted with a glaze to improve the damage resistance of the window portion of the composite door system 100. The glaze may be made from a material that is the same as or similar to the materials of the window portion described above. Moreover, the glaze may be applied using any method, such as painted, heat sealed, applied as a sticker, or the like.

FIG. 6 illustrates one embodiment of a barrier structure 10 that utilizes one or more composite door systems 100, in accordance with some embodiments of the disclosure. It should be understood that one or more composite door systems 100 may be utilized in a number of different barrier structures 10, such as in temporary structures, permanent structures, walls, partitions, or the like.

Regardless of how the composite door systems 100 are utilized, it should be understood that the composite door systems 100 are created and installed in accordance with the composite door system manufacturing and assembly process 400, as illustrated in FIG. 7. As illustrated by block 410 in FIG. 7, the members for the shell 80 of the composite door system are created, for example, by cutting (e.g., using a shears, lasers, water, or the like cutting devices), stamping (e.g., stamping, cold forming, pressing, or the like), or other like method of creating the desired members.

Block 420 of FIG. 7 further illustrates that the shell 80 of the composite door system 100 is formed. For example, the members are operatively coupled together, such as by bending portions of the members (e.g., bending the portions to create one or more of the sides and/or faces from a single member) and/or using a connector (e.g., welding, using a fastener—bolt, rivet, screw, clamp, bracket, shearing of lapped portions of the shell, or the like) to operatively coupled two or more members together.

FIG. 7 further illustrates in block 430 that the one or more hardware housings 150 and the shell 80 are operatively coupled together in one or more locations. As previously discussed herein, the hardware housings 150, may comprise the members (e.g., channels) of the sides of the shell 80, a solid hardware housing 160, a cased hardware housing 170, a tubular hardware housing 180, and/or the like that are operatively coupled to (e.g., within, butted against, or the like) the shell 80. As previously described herein, the hardware housings 150 are used to secure the hardware for the composite door system 50. Moreover, once the hardware housings 150 are operatively coupled to the shell 80, the hardware may be operatively coupled to the composite door system 10. For example, channel members (e.g., channel hardware housing), the solid hardware housings 160 (e.g., which may be machined to receive the hardware), the case hardware housings 170, and/or the tubular hardware housings 180, may be prepared to receive the hardware assembled to the composite door system 10. It should be understood that the hardware may be operatively coupled to the hardware housings 150 at this point before the fill material 140 is provided to the composite door system 100, or alternatively, the hardware may be assembled on-site (e.g., before or after the fill material 140 is provided to the composite door system 100).

Block 440 of FIG. 7 further illustrates that the one or more shells 80 are shipped to the location at which the barrier structure 10 is to be assembled and/or installed using the composite door systems 100. Since the composite door systems 100 only comprise the shells 80, the shipping weight is much less than conventional doors for barrier systems 10 (e.g., commercial FEBR doors, doors made of fiberglass, Kevlar, or other types of projectile doors, or the like). In this way, manufacturing and shipping costs are greatly reduced. Furthermore, the locally sourced fill material 140 may be utilized and/or formed onsite at the assembly location. Sourcing the fill material 150 locally may further reduce shipping and/or installation costs.

FIG. 7 further illustrates in block 450 that the fill material 140 may be created and/or formed on site, such as for example, at the assembly location of the building structure 10. For example, powered material may be formed and/or created at the assembly location, and thereafter, mixed with a liquid (e.g., water) in order to create the fill material 140

(e.g., cementitious, composite cementitious, or the like fill material in liquid form). Block 460 further illustrates that the liquid fill material 140 formed may then be inserted into the shell 80. For example, the liquid fill material 140 may be poured into the channel (e.g., top u-channel 130) at the top side 112 of the composite door system 10. In this way, the channel may provide a feeding location for the fill material 140 for the composite door system 100. As such, the liquid fill material 140 may at least partially fill the channel, and the one or more openings 131 in the channel or other member at the top side 112 may allow the liquid fill material 140 to flow into the cavity 114, and thus, at least partially fill the cavity 114. It should be understood that a pre-determined amount of liquid fill material 140 may be provided to the cavity 114 based on the size and shape of the composite door system 100; however, it should be understood that the u-channel provides a fill gage, such that when the u-channel begins to fill with a liquid fill material 140 it should be understood that the cavity 114 may be filled because no additional liquid fill material is passing through the one or more openings 131 of the member on the top side 112 of the composite door system 100. While it is generally described herein that the liquid fill material 140 is poured into the shell 80 through one or more openings 131 in the top side 112 of the composite door system 100, it should be understood that the one or more openings 131 may be additionally and/or alternatively located in a portion of the first face 102, second face 104, first side 106, second side 108 and/or bottom side 110. For example, it may be beneficial to fill the composite door system 100 in the orientation in which it is going to be installed. As such, the one or more barrier systems 10 may be positioned in any orientation and filled with liquid fill material and allowed to harden before orienting the composite door system 100 for installation in a barrier structure 10.

Block 470 of FIG. 7 further illustrates that the liquid fill material 150 is allowed to cure within the cavity 114 into a solid core 90 in order to create the composite door system 100.

FIG. 7 further illustrates in block 480 that the composite door systems 100 and/or other components (e.g., structural members, panels, or the like) are assembled together in order to create a barrier structure 10. Any of the embodiments of the composite door systems 100 discussed herein may be utilized to construct a barrier structure 10 having one or more walls 12, one or more doors 14, one or more roofs, one or more partitions, and/or any other structural components of any type of barrier structure 10. Moreover, the composite door systems 100 may be combined with other types of doors and/or walls as desired to form the desired barrier structure 10.

Barrier structures 10, such as dwellings, buildings, partitions, and the like, typically comprise doors 14, walls 12 (e.g., panels), or the like, and in many instances, it is desirable that the barrier structures 10 provide resistance to and protection from physical impacts from projectiles. The projectiles may occur due to debris from extreme weather (e.g., hurricanes, tornados, severe thunderstorms, typhoons, or the like). Alternatively, the projectiles may be ballistics from firearms, ordnance, explosive devices, or the like. In still other embodiments, the projectiles may be a result of explosions that could occur due to gas, chemicals, or other like explosive materials. In still other embodiments the projectiles may be a result of destructive testing of products (e.g., crash testing of cars, blade out turbine testing, or performance testing of other products). Additionally, it may be desirable to have improved fire resistance, sound proofing, radiation protection, electromagnetic shielding, or the like.

Conventional FE (forced entry) and/or BR (Bullet Resistant) doors, otherwise described herein as FEBR door openings, use ballistic resistant materials such as steel armor, composite BR fiberglass, Kevlar, BR composites, or other like materials as part of the core components, all of which add weight to door. FEBR door openings utilizing these conventional materials can weigh 450-750 pounds depending on the size, core type and steel gauges used. This extreme weight increases the wear on the door opening hardware, increases the freight costs, installation and user handling risks and cost of ownership.

The conventional FEBR doors described above are not only extremely heavy, costly to transport, undesirably bulky and dangerous during shipping or should they fail during operation, but they also are potentially unable to provide the desired projectile resistance within the desired door sizes. The weight of conventional FEBR doors not only makes manufacturing, shipping, and installing the doors difficult and dangerous, but it also causes problems when operating the doors. For example, the doors are difficult for a user to move, and they cause detrimental wear and tear to the hardware components of the door, such as the hinges, door opening mechanisms, etc. degrading the operation of the doors and/or requiring replacement of the hardware components. The weight of these doors makes the freight and shipping costs for transportation extremely high, in particular, when these doors are shipped long distances (e.g., thousand(s) of miles), and moreover, this makes it difficult to quickly build temporary structures in dangerous locations that provide protection from projectiles. As such, conventional door products for FEBR and enhanced protection openings are approaching their performance limits.

The composite door systems 100 (for use in door openings) of the present disclosure alleviate the foregoing deficiencies with conventional doors, and also provide additional advantages. For example, the composite door systems 100 of the present invention provide improved security, enhanced threat protection, and use of more sustainable materials to reduce weight, waste, lower the cost of ownership and the impact on the environment.

First, the composite door systems 100 of the present disclosure provide outstanding resistance to and protection from a variety of physical impacts by projectiles. In particular, the composite door systems 100 are structured to provide various UL level protection from ballistic projectiles (e.g., firearm, or the like) and also protection from other projectiles such as debris or shrapnel. As such, the composite door systems 100 described herein may provide the desired FE (forced entry) and/or BR (Bullet Resistant) properties while providing reduced weights and/or improved shipping and/or installation processes. For example, the composite door systems 100 may have UL752 Level 1 (9 mm handgun) to UL 752 Level 10 (.50 Caliber Rifle) protection, and in particular embodiments UL752 level 1 (9 mm), UL752 level 2 (0.357 Magnum), UL752 level 3 (0.44 Magnum), UL752 level 4 (.30 Caliber Rife), UL752 level 6 (9 mm rifle), UL752 level 7 (5.56 mm), UL752 level 8 (7.62 mm), UL752 level 9 (0.30-06 rifle), UL752 level 10 (.50 caliber rifle), or the like protection, or have protection that ranges between, overlaps, or falls outside of these levels of protection. Furthermore, the composite door systems 100 may also be rated to withstand 5, 10, 15, 20, 25, 30, 40, 50, 60, or the like minutes of simulated "mob" attack, or range between, overlap, or fall outside of these levels of protection. As such, it should be understood that the barrier structures 10 described herein may be shipped and/or assembled on site in the desired location quickly and cost effectively, while providing the desired levels of projectile protection.

As an example, a door made from conventional projectile-resistive materials, such as armor steel or BR fiberglass core, weighs about 450-750 lbs. However, a door made from a composite cementious fill material may be 5, 10, 15, 20, 25, 30, 35, 40, 45, 50, 60, 70, or the like percent lighter. As such, because the shells 80 of the composite door system 100 are extremely light weight, they may be shipped in greater quantities due to the reduced weight, and may be installed and/or replaced (should a door need replacing) using smaller equipment (e.g., trucks, smaller cranes, or the like) than would be required with comparable conventional steel armor, BR fiberglass, or other like conventional door material. Moreover, the composite door systems 100 can be retrofit in existing buildings. Furthermore, it should be understood that the shells 80 may be installed in the barrier structure 10 (e.g., the door shells may be installed first) for ease of installation before the fill material 140 is added to the shells 80. Consequently, regardless of the installation methods, the weight reductions of the present disclosure reduce freight costs (e.g., due to reduced fuel needs), lowers cost of ownership, and reduces operator risk, wear and tear on hardware and installation and/or maintenance.

Moreover, the composite door systems 100 of the present disclosure are also about 20% stronger than conventional projectile-resistive materials (e.g., concrete, or other like materials). As such, all things being equal (e.g., the size of the door, thickness thereof, or the like) the composite door systems 100 of the present disclosure may be 5, 10, 15, 20, 25, 30, 35, 40, 45, 50, 60, or the like percent stronger than a corresponding concreate system.

The composite door systems 100, as disclosed herein, utilize construction materials and alternate core materials, and are formed in a way that is environmentally friendly. For example, the materials of the shell 80 and/or core 90 may be made from recyclable and/or repurposed materials (e.g., 10, 20, 30, 40, 50, 60, 70, or the like percent recyclable and/or repurposed). Moreover, the steel used in the shell (otherwise described as a skin) may be made from recycled and/or repurposed materials (e.g., 10, 20, 30, 40, 50, 60, 70, 80, 90 or the like percent recycled and/or repurposed). Furthermore, the composite door systems 100 may replace conventional FEBR core materials and/or adhesives that are petroleum based or produced from materials that are less environmentally friendly. In some embodiments, the composite door systems 100 may meet UL Environmental/Sustainable Solutions for GREENGUARD and GREENGUARD Gold certification. Additionally, the composite door systems 100 may meet compliance and third party validation for Environmental Product Declarations (EPD), DECLARE labels, Living Building Challenge requirements, and/or compliance to California Prop65.

The composite door systems 100 described herein reduce the cost of the end product and manufacturing methodology, and moreover, the composite door systems 100 reduce the environmental and resource costs when compared to conventional FEBR doors.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and should not be interpreted in an idealized or overly formal sense unless expressly so defined herein. Certain terminology is used herein for convenience only and is not to be taken as a limitation on the invention. For example, words such as "distal," "proximal," "upper," "top," "bottom," "lower," "left," "right," "horizontal," "vertical," "upper," and "lower", or other like terminology merely describe the configuration shown in the figures. The referenced components may be oriented in an orientation other than that shown in the drawings and the terminology, therefore, should be understood as encompassing such variations unless specified otherwise. It will be understood that when an element is referred to as "operatively coupled" to another element, the elements can be formed integrally with each other, or may be formed separately and put together. Furthermore, "operatively coupled" to can mean the element is directly coupled to the other element, or intervening elements may be present between the elements. Furthermore, "operatively coupled" may mean that the elements are detachable from each other, or that they are permanently operatively coupled together.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A composite door system comprising:

a shell comprising a first face, a second face, a first side member, a second side member, and a bottom side member, wherein the first face, the second face, the first side member, the second side member, and the bottom side member form a cavity, wherein the shell has one or more openings, and wherein the first face and the second face of the shell are made of steel that is 14 gauge or a lower numerical gauge;

a plurality of support members operatively coupled to the first face and the second face of the shell;

one or more hardware housings operatively coupled to an interior of the shell, wherein the one or more hardware housings are configured to resist flow of a liquid fill material, and wherein the one or more hardware housings are configured to receive hardware for the composite door system; and a fill material comprising a composite cementitious material, wherein the fill material is provided through the one or more openings of the shell in the liquid fill material form and hardens to a solid fill material form within the cavity;

wherein the plurality of support members provide structural support to resist damage to the shell during shipping before receiving the liquid fill material on-site;

wherein the one or more hardware housings at least comprise a plate operatively coupled to an interior of the first face or an interior of the second face at a hardware location that is adjacent a top of the composite door system; and wherein the liquid fill material is provided through the one or more openings of the shell on-site before installation of the composite door system.

2. The composite door system of claim 1, wherein the composite door system, including the shell, the one or more hardware housings, and the solid fill material provide at least UL752 Level 8 protection or greater.

3. The composite door system of claim 1, wherein the one or more hardware housings further comprises a solid hardware housing, wherein the solid hardware housing is machined in order to receive the hardware.

4. The composite door system of claim 1, wherein the one or more hardware housings further comprise a channel hardware housing, wherein the channel hardware housing is formed from at least one side member of the shell.

5. The composite door system of claim 1, wherein the one or more hardware housings further comprise a cased hardware housing, and wherein the cased hardware housing is configured to receive the hardware.

6. The composite door system of claim 1, wherein the one or more hardware housings further comprise a tubular hardware housing, and wherein the tubular hardware housing is configured to receive the hardware.

7. The composite door system of claim 1, wherein the one or more hardware housings further comprise one or more layers of projectile resistant material to provide additional projectile resistance where the hardware is located.

8. The composite door system of claim 1, wherein the first face and the second face of the shell are made of steel that is 12 gauge or a lower numerical gauge.

9. The composite door system of claim 1, further comprising a top side member having the one or more openings, and wherein the one or more openings are configured to receive the liquid fill material and allow the liquid fill material to pass into the cavity.

10. The composite door system of claim 9, wherein the top side member comprises a channel with the one or more openings, and the channel is located between edges of the first face and the second face.

11. The composite door system of claim 10, wherein the channel comprises a u-shaped channel formed form a web, a first flange, and a second flange, wherein the first flange and the second flange are operatively coupled to the first face and the second face.

12. A shell for a composite door system, the shell comprising:
 a first face, a second face, a first side member, a second side member, and a bottom side member, wherein the first face, the second face, the first side member, the second side member, and the bottom side member form a cavity, wherein the shell has one or more openings, and wherein the first face and the second face of the shell are made of steel that is 14 gauge or a lower numerical gauge;
 a plurality of support members operatively coupled to the first face and the second face of the shell;
 one or more hardware housings operatively coupled to an interior of the shell, wherein the one or more hardware housings are configured to resist flow of a liquid fill material, and wherein the one or more hardware housings are configured to receive hardware for the composite door system;
 wherein the plurality of support members provide structural support to resist damage to the shell during shipping before receiving the liquid fill material on-site;
 wherein the one or more hardware housings at least comprise a plate operatively coupled an interior of the first face or an interior of the second face at a hardware location that is adjacent a top of the composite door system; and
 wherein the shell is configured to receive the liquid fill material on-site through the one or more openings to form the composite door system when the liquid fill material hardens into a solid fill material, wherein the solid fill material comprises a composite cementitious material.

13. The shell of claim 12, wherein the composite door system, including the shell, the one or more hardware housings, and the solid fill material provide at least UL752 Level 8 protection or greater.

14. The shell of claim 12, wherein the one or more hardware housings further comprise:
 a channel hardware housing, wherein the channel hardware housing is formed from at least one side member of the shell; or
 a cased hardware housing, and wherein the cased hardware housing is configured to receive the hardware.

15. The shell of claim 12, wherein the one or more hardware housings further comprise one or more layers of projectile resistant material to provide additional projectile resistance where the hardware is located.

16. A method of forming a composite door system, the method comprising:
 forming a shell, wherein the shell comprises a first face, a second face, a first side member, a second side member, and a bottom side member, wherein the first face, the second face, the first side member, the second side member, and the bottom side member form a cavity, wherein the shell has one or more openings, wherein the first face and the second face of the shell are made of steel that is 14 gauge or a lower numerical gauge, and wherein a plurality of support members operatively coupled to the first face and the second face of the shell; and
 assembling one or more hardware housings to the shell before or after the first face, the second face, and/or the plurality of support members are operatively coupled to the first face and the second face, wherein the one or more hardware housings at least comprise a plate operatively coupled an interior of the first face or an interior of the second face at a hardware location that is adjacent a top of the composite door system, wherein the one or more hardware housings are configured to resist flow of a liquid fill material, and wherein the one or more hardware housings are configured to receive hardware for the composite door system;
 shipping the shell on-site before receiving the liquid fill material, wherein the plurality of support members provide structural support to resist damage to the shell during shipping; and
 providing the liquid fill material to the shell on-site, wherein the liquid fill material comprises a composite cementitious material, wherein the liquid fill material is provided through the one or more openings of the shell and hardens into a solid fill material within the cavity.

17. The method of claim 16, wherein the shell is formed at a manufacturing facility and shipped, and providing the liquid fill material to the shell occurs at a distribution facility that further ships the composite door system for installation on-site or occurs on-site at an installation site.

18. The method of claim 16, wherein the composite door system, including the shell, the one or more hardware housings, and the solid fill material provide at least UL752 Level 8 protection or greater.

* * * * *